United States Patent [19]

Canales et al.

[11] 4,442,083

[45] Apr. 10, 1984

[54] METHOD OF DESULFURIZING WASTE GASES CONTAINING SULFUR DIOXIDE

[75] Inventors: Manuel J. Canales, Orange, Conn.; John Reynolds, El Cerrito, Calif.

[73] Assignee: Stauffer Chemical Company, Westport, Conn.

[21] Appl. No.: 439,257

[22] Filed: Nov. 4, 1982

[51] Int. Cl.$^3$ .................. C01B 17/00; C01B 17/02
[52] U.S. Cl. .............. 423/567 R; 423/573 R; 423/573 G; 423/574 R; 423/574 L; 423/242
[58] Field of Search ............ 423/567 R, 570, 571, 423/573 R, 573 G, 574 R, 574 L, 576, 242 A

[56] References Cited

U.S. PATENT DOCUMENTS

| | | | |
|---|---|---|---|
| 3,653,812 | 4/1972 | Schneider et al. | 423/242 |
| 3,911,093 | 10/1975 | Sherif et al. | 423/574 |
| 3,969,492 | 7/1976 | Witte et al. | 423/574 |
| 4,048,293 | 9/1977 | Renault et al. | 423/574 |
| 4,181,506 | 1/1980 | Bengtsson | 423/242 X |

*Primary Examiner*—Gregory A. Heller
*Attorney, Agent, or Firm*—Richard P. Fennelly

[57] ABSTRACT

Sulfur dioxide ($SO_2$) is absorbed from waste gases by absorbing $SO_2$ in an aqueous absorbent comprising soluble sulfite in an absorber; stripping the $SO_2$ from the absorbent; absorbing the stripped $SO_2$ in a separate absorbent for the $SO_2$; and reacting the thus absorbed $SO_2$ in a liquid Claus reactor forming sulfur. In a preferred embodiment, the gas from the stripping step is subjected to a condensation step in a heat exchanger boiler where steam ingoing to the stripper is generated.

8 Claims, 1 Drawing Figure

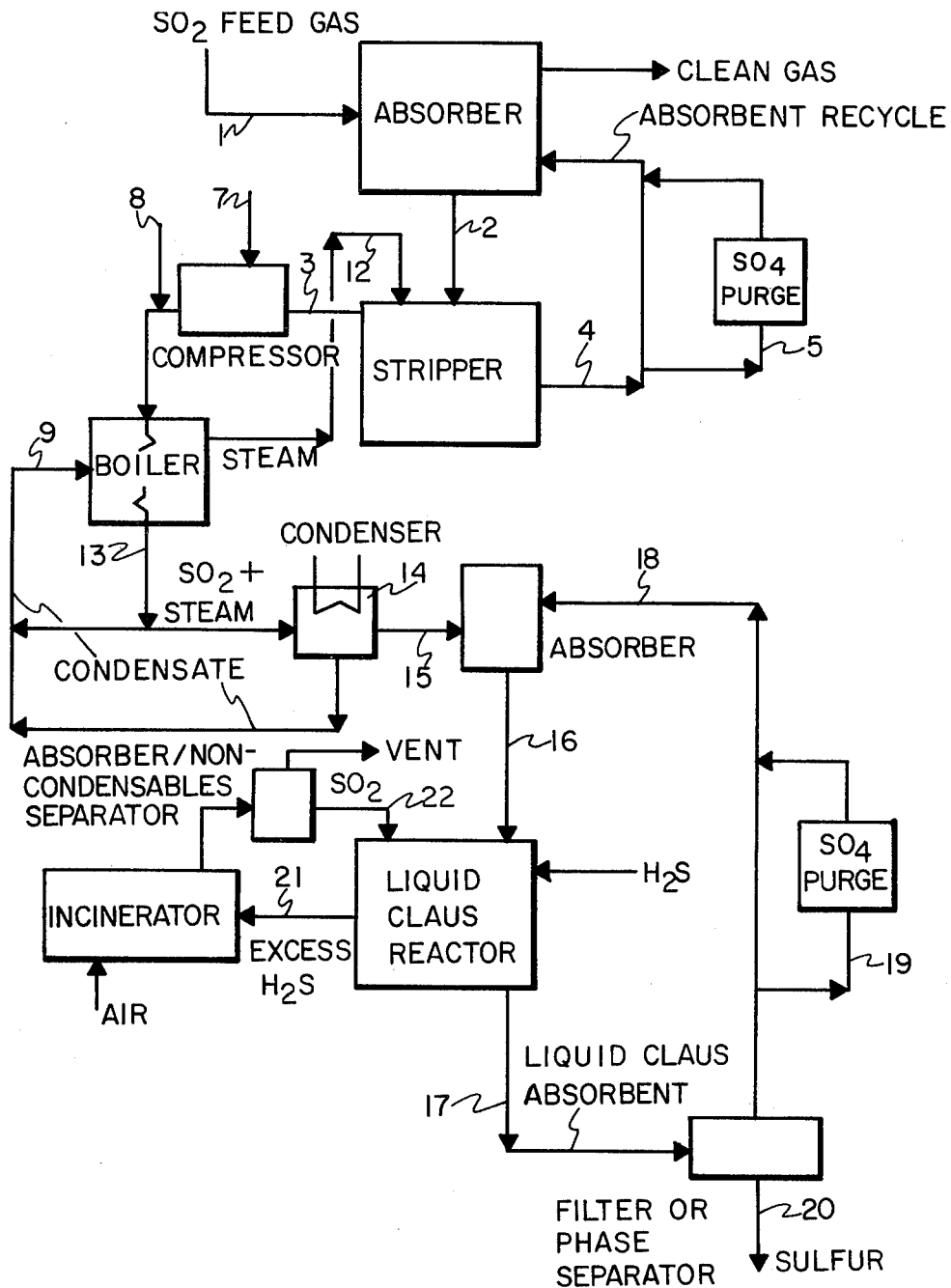

METHOD OF DESULFURIZING WASTE GASES CONTAINING SULFUR DIOXIDE

BACKGROUND OF THE INVENTION

1. Field of the Invention

The present invention relates to a process to recover sulfur values from waste gas emissions, e.g., a flue gas or tail gas, by use of an absorbent containing sulfites followed by a liquid phase Claus reaction to produce sulfur as a useable by-product.

2. Description of the Prior Art

U.S. Pat. No. 4,048,293 to P. Renault et al. describes a process in which a feed gas containing sulfur dioxide ($SO_2$) is contacted with an aqueous ammonia and/or ammonium sulfite absorbent to remove $SO_2$ from the gas, the $SO_2$-rich absorbent is heated producing a gas stream comprising $NH_3$, $SO_2$ and steam, and hydrogen sulfide ($H_2S$) is reacted with the gas stream containing $NH_3$, $SO_2$ and steam in a high temperature liquid phase Claus reactor, preferably in the presence of an organic solvent, at a temperature of 100° C. to 200° C. to produce sulfur. The liquid phase from the heating step in the Renault et al. process may be discharged from the plant, but is preferably fed to another reactor for reaction of the ammonium sulfate contained therein with a reducing agent yielding a second gas stream comprising $SO_2$ and ammonia which is then fed to the high temperature liquid phase Claus reactor (Col. 1, lines 51-56). In addition, the excess $H_2S$ from the Claus reactor tail gas is oxidized catalytically to form $SO_2$ which is fed back to the ammonia and/or ammonium sulfite absorber.

The process shown in the Renault et al. patent relies upon a substantially total thermal decomposition of the $SO_2$-rich absorbent in its stripping step yielding $NH_3$ (which is derived from the cation, $NH_4^+$, of the absorbent and which is recycled to the absorber), $SO_2$ and steam. Such a process requires a thermal decomposition step for the sulfite absorbent, a chemical reduction for the sulfate species that are also present, and oxidation of the ammonia-rich recycle gas.

The ammonia-containing gas stream produced in the Renault et al. process is reacted directly with hydrogen sulfide in a liquid phase Claus reactor at relatively high temperatures (e.g., 100°–200° C.). This has several disadvantages. The presence of such contaminants as ammonia in the Claus reactor can cause undesired side reactions rather than the desired reaction of $H_2S$ with $SO_2$ to yield sulfur. Also, the use of such high temperatures inhibits the substantial completion of the Claus reaction yielding a reactor tail gas effluent that contains a higher $SO_2$ content than otherwise possible.

SUMMARY OF THE PRESENT INVENTION

The present invention utilizes any soluble sulfite, e.g., sodium or ammonium sulfite, to absorb $SO_2$ from a feed gas and form the bisulfite species, stripping of $SO_2$ and steam from the $SO_2$-rich absorbent without also liberating the cation, absorption of the $SO_2$ contained in the $SO_2$/steam mixture in a separate liquid phase, and reaction with $H_2S$ to form sulfur at low temperature so that the Claus reaction completion is favored and the unreacted $SO_2$ is negligible thus avoiding the need for its recycle to the sulfite absorber. A minor amount of sulfate is a by-product produced by oxidation side reactions. The cation is recycled back to the $SO_2$ absorber in the form of regenerated sulfite species. Minor losses of cation leaving the system in the by-product sulfate salts are made up by addition of cation at the absorber in suitable form, e.g., ammonia, sodium hydroxide or carbonate, etc. In the present process, in order to achieve economies of energy, the steam/$SO_2$ mixture from the stripping step is preferably compressed sufficiently to provide a positive temperature driving force to permit it to be at least partially condensed in a heat exchanger boiler where the steam ingoing to the stripper is generated. In addition, in the present process, the sulfate by-product contained in the absorbent is separated by means of crystallization (i.e., cooling or evaporative crystallization). The present process recycles any $SO_2$ formed by the incineration of excess $H_2S$ contained in the Claus reactor tail gas back to that reactor, instead of to the waste gas absorber, thus avoiding the need for the selective catalytic oxidation step, and reducing the $SO_2$ load in the absorber.

This process greatly simplifies the equipment needed, avoids unnecessary energy costs and a selective catalytic oxidation step, and produces a by-product with valuable commercial properties (e.g., ammonium or sodium sulfate).

DESCRIPTION OF THE DRAWING

The Drawing depicts a process flow sheet for a preferred embodiment of the present invention.

DESCRIPTION OF THE PREFERRED EMBODIMENTS

A feed gas (e.g., flue gas) containing undesired $SO_2$ contaminant (and possibly lower amounts of $SO_3$) is fed via line 1 to an absorber for contact with an aqueous absorbent comprising a soluble sulfite (such as ammonium or sodium sulfite) at a temperature of from about 0° to about 100° C., typically from about 35° to about 65° C. The $SO_2$ is dissolved and picked up by the sulfite ions to form bisulfite ions in accordance with the following reaction: $SO_3^{-2} + SO_2 + H_2O \rightarrow 2HSO_3^-$. The $SO_2$-rich absorbent is discharged via line 2 in the form of a soluble bisulfite solution with clean waste gas being discharged from the reactor as overhead gas.

The $SO_2$-rich stream 2 is fed to a stripper in which steam (supplied via line 12) is used to convert the bisulfite contained therein back to sulfite, liberating $SO_2$ and water (in the form of steam) at temperatures of from about 65° C. to about 125° C. depending upon the type of sulfite present. No substantial amounts of the cation species of the absorbent (e.g., ammonium or sodium) are driven off during this stripping step. A gaseous mixture of $SO_2$ and steam is removed from the stripper via line 3, whereas $SO_2$-lean sulfite absorbent is removed by 4 for recycle to the absorber. A sulfate purge stream 5 allows for removal of some of the lean absorbent for the purpose of recovery of sulfate species from the stream. The removal of sulfate can be accomplished by any means known to the art (e.g., by temperature swing crystallization, evaporative crystallization, etc.). The sulfate is present due, in part, to the $SO_3$ content of the waste gas and, in part, due to oxidation of the sulfite absorbent and bisulfite species.

In order to achieve enhanced economies of operation in regard to the use of steam supplied to the stripper, the present process preferably uses mechanical recompression of the compressed steam/$SO_2$ mixture to generate steam for the stripper. This type of process is shown in U.S. Pat. No. 4,181,506 to S. Bengtsson. In the Drawing, the steam/$SO_2$ mixture taken from the stripper at 3 is passed through a mechanical compressor. Motive steam is supplied to the compressor at 7, if the compressor is a steam ejector or, at 8, if it is necessary for making up steam losses. The compressed mixture is then fed to a boiler where a substantial portion of the steam condenses. The uncondensed portion passes through line 13 to a condenser where more steam is condensed. The condensate streams are collected and fed via line 9 to a reboiler where the condensate is revaporized to provide the stripping steam. The temperature difference between the condensing side and the boiling side of the reboiler is provided by the compression which elevates the condensing temperature of the steam/$SO_2$ mixture.

The remaining steam/$SO_2$ mixture could be processed in either a sulfuric acid plant to produce sulfuric acid or in a conventional Claus plant to produce sulfur, but either has a disadvantage. For example, either would require the substantially complete drying of the $SO_2$ and treatment of the tail gas from the sulfuric acid plant or the Claus plant to avoid another $SO_2$ contaminated stream.

These undesirable elements can be avoided, in accordance with the present invention, by coupling the absorbing/stripping section of the instant process with a separate liquid phase Claus reactor which operates at a relatively low temperature so that the Claus reaction is essentially completed and there is no need to recycle sulfur compounds back to the sulfite absorber. One representative example of such a reactor is described in U.S. Pat. No. 3,911,093 (involving the use of an alkali metal phosphate buffered aqueous solution as an absorbent). Other suitable absorbents include ammonium phosphate buffered solutions, alkali metal or ammonium citrate buffered solutions, or unbuffered aqueous solutions. The liquid phase Claus reaction generally takes place at a pH of from about 2.5 to about 5.5 and temperatures of from about 30° C. to about 95° C.

The steam/$SO_2$ mixture is taken to an absorber via line 15. The $SO_2$ dissolves in the absorber liquid and is transported by means of line 16 to a reactor where hydrogen sulfide is introduced. The hydrogen sulfide and dissolved $SO_2$ react according to the classic Claus reaction producing sulfur and water. Sulfur and the absorbing liquid are taken out of the reactor through line 17, and the sulfur is separated in a filter or phase separator and taken to appropriate storage vessels by means of line 20. A small amount of unreacted, excess $H_2S$ is taken out of the reactor by means of line 21, incinerated to $SO_2$ and returned to the liquid phase Claus reactor via line 22. An absorber/noncondensables separator vessel can be placed in line 22. This vessel allows for the venting of such noncondensable substances as nitrogen, oxygen and carbon dioxide which might be present in the effluent from the incinerator.

Since, in a preferred embodiment, the Claus reaction proceeds in an aqueous environment, the sulfur produced is insoluble and comes out of solution, and the reaction is preferably carried out with an $H_2S$ excess, so that the reaction $$2H_2S + SO_2 \rightarrow 3S + 2H_2O$$

proceeds irreversibly and substantially completely. The aqueous phase, therefore, has substantially no $SO_2$ concentration leaving the reactor. This permits $SO_2$ recovery efficiencies approaching 100% in the absorber thus eliminating the need for any further tail gas cleaning for the vent from the absorber/non-condensables separator vessel.

The lean solution from the filter or phase separator recycles to the absorber by means of line 18. A slip stream from the lean solution is withdrawn via line 19 and taken to a sulfate purge unit to remove sulfates by crystallization or other suitable means. A small amount of sulfate is formed due to side oxidation reactions.

The claims which are attached are intended to measure the scope of protection sought.

What is claimed:

1. A process for the removal of sulfur dioxide from a feed gas which comprises:
    (a) absorbing the sulfur dioxide ($SO_2$) in an aqueous absorbent comprising soluble sulfite;
    (b) stripping the absorbent from (a) which contains absorbed $SO_2$ to form a gas comprising $SO_2$ and wherein the absorbent is recycled back to the absorber from the stripper;
    (c) absorbing the stripped $SO_2$ in a separate absorbent for the $SO_2$; and
    (d) reacting the absorbed $SO_2$ from step (c) in a liquid Claus reactor thereby forming sulfur and wherein excess $H_2S$ in the tail gas from the Claus reactor is incinerated to form $SO_2$ which is recycled to the Claus reactor.

2. A process as claimed in claim 1 wherein the stripping step (b) results in no substantial liberation of the cation species of the absorbent.

3. A process as claimed in claim 1 wherein the absorption of $SO_2$ in absorbent in Step (a) occurs at a temperature of from about 20° C. to about 100° C.

4. A process as claimed in claim 1 wherein the absorbent in step (c) is a phosphate absorbent.

5. A process as claimed in claim 1 wherein the stripping of absorbed $SO_2$ occurs at a temperature of from about 65° C. to about 125° C.

6. A process as claimed in claim 1 wherein gas from the stripping step is subjected to mechanical recompression to generate steam for the stripper.

7. A process as claimed in claim 4 wherein gas from the stripping step is subjected to mechanical recompression to generate steam for the stripper.

8. A process as claimed in claim 4 wherein gas from the stripping step is subjected to mechanical recompression to generate steam for the stripper, the stripping of absorbed $SO_2$ occurs at a temperature of from about 100° C. to about 140° C.

* * * * *